Jan. 29, 1952     J. F. KOSTOLECKI     2,583,858
AUTOMATIC SWIVEL LOCKING CASTER
Filed Dec. 10, 1949     2 SHEETS—SHEET 1
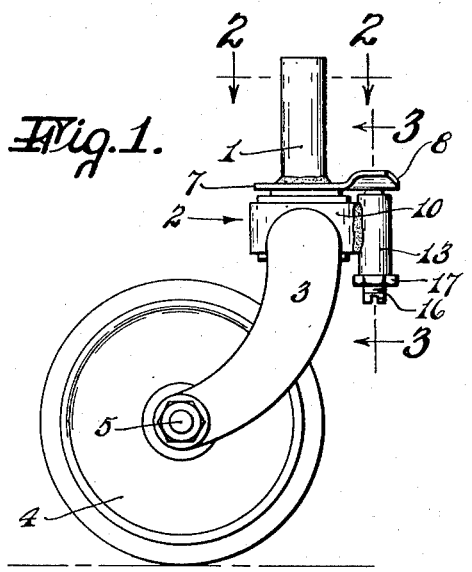
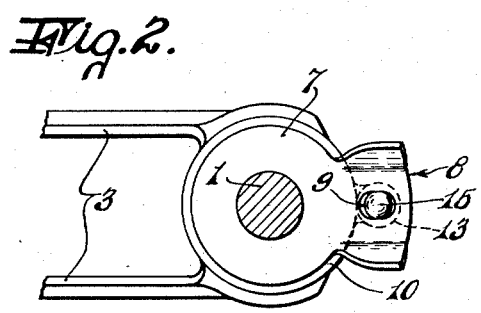
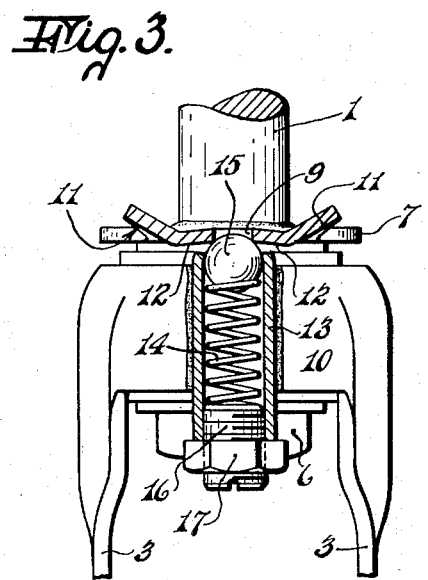
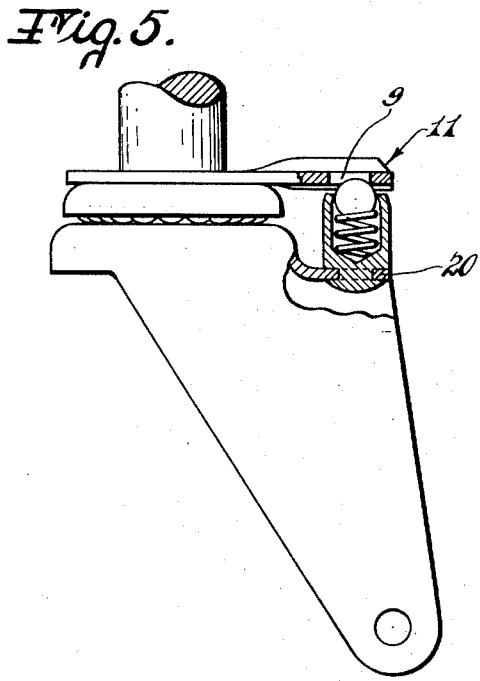
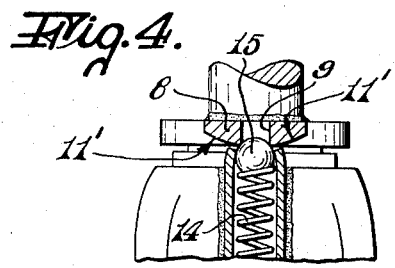
INVENTOR
JOHN F. KOSTOLECKI
BY Chapin & Neal
ATTORNEYS Jan. 29, 1952  J. F. KOSTOLECKI  2,583,858
AUTOMATIC SWIVEL LOCKING CASTER
Filed Dec. 10, 1949  2 SHEETS—SHEET 2
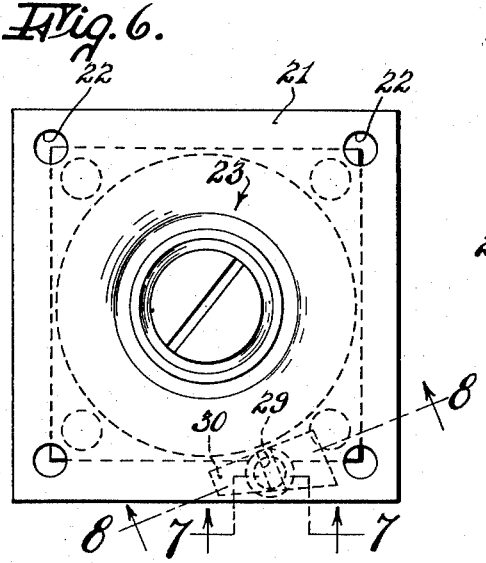
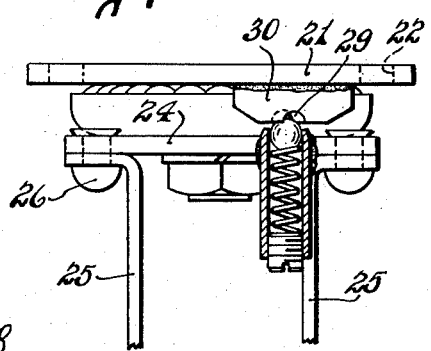
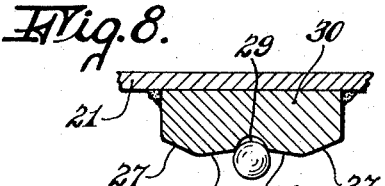
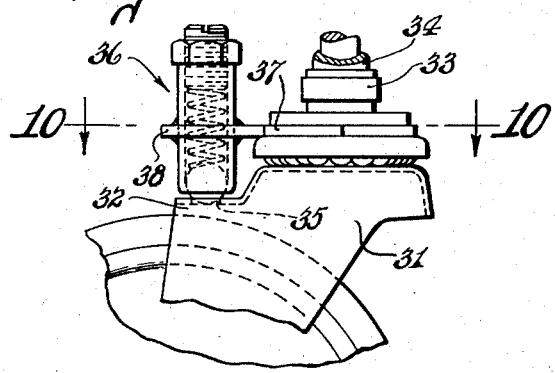
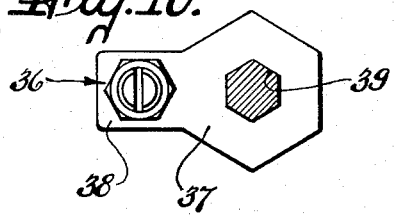
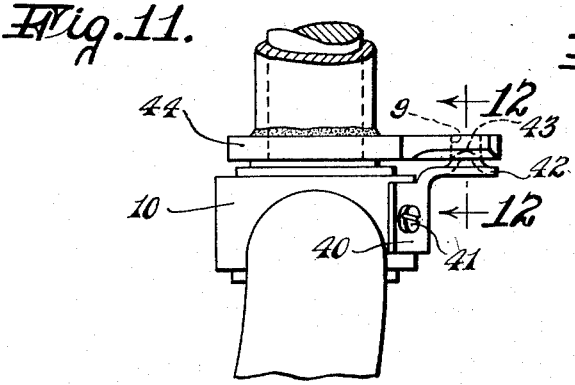
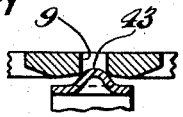
INVENTOR
JOHN F. KOSTOLECKI
BY Chapin & Neal
ATTORNEYS

Patented Jan. 29, 1952

2,583,858

UNITED STATES PATENT OFFICE 2,583,858

AUTOMATIC SWIVEL LOCKING CASTER

John F. Kostolecki, Palmer, Mass., assignor to Jarvis & Jarvis, Inc., Palmer, Mass., a corporation of Massachusetts Application December 10, 1949, Serial No. 132,337

3 Claims. (Cl. 16—35)

This invention relates to improvements in swivel casters and has for an object provision of an automatic swivel locking mechanism. This application is a continuation in part of an application, Serial No. 91,156, filed May 3, 1949, now abandoned, by John F. Kostolecki.

A primary object is to provide a locking mechanism automatically operable to hold said swivel and a caster wheel in a predetermined position with respect to the support on which the caster is attached and in such holding means to provide for the automatic release of the same by application of a predetermined rotative force to the caster swivel.

Many devices such as hospital beds and other equipment which require the use of swivel casters for handling and moving in all directions are more or less difficult to guide in a straight line direction when pushing the same for some distance as in transporting a patient along hospital corridors. In many cases if one attendant is present he must station himself at the side of a bed or stretcher in order to keep the front and rear wheels in approximate alignment and prevent either end from weaving. Often two attendants, one at the front and one at the rear, are present to guide the bed and assure the patient's comfort and proper handling.

It is well known that swivel lock constructions for casters have been proposed heretofore. Yet such prior art constructions require an independent act of manipulation by the attendant in order to lock or disconnect the same.

The present invention is an automatically operable mechanism and may be adapted to existing swivel caster designs. It is an inexpensive, serviceable, and rugged mechanism. Its advantages will be apparent from the following disclosure in connection with the accompanying drawings, in which:

Fig. 1 is a side elevation of a caster embodying locking mechanism according to the invention;

Fig. 2 is a view on line 2—2 of Fig. 1;

Fig. 3 is a view on line 3—3 of Fig. 1;

Fig. 4 is a view similar to that of Fig. 3 of a modified form of locking mechanism;

Fig. 5 is a side view of a modification of the mechanism adapted to a different form of caster construction;

Fig. 6 is a top view of the invention adapted to a different form of swivel caster;

Fig. 7 is a view on line 7—7 of Fig. 6;

Fig. 8 is a detail sectional view on line 8—8 of Fig. 6;

Fig. 9 is a side view of a further modified form of the invention as applied to another type of caster construction;

Fig. 10 is a view on line 10—10 of Fig. 9;

Fig. 11 is a side elevational view showing a different application of the invention; and Fig. 12 is a detail sectional view on line 12—12 of Fig. 11.

As shown by Figs. 1 to 3 the caster assembly includes a supporting member as stem 1, a collared swivel connection at 2 with a forked member as wheel support 3, and a wheel 4 pivotally attached to the fork 3 as at 5. The swivel connection is held on stem 1 by a nut 6.

Swivel caster constructions are well known and will be readily understood by those skilled in the art. Stem 1 is attached in fixed position to a tubular leg support and the wheel through the swivel connection is then freely rotatable with respect to the immovable stem and leg support.

On the stationary stem 1 immediately above the swivel connection is mounted as by welding to the stem a disk 7 having an offset 8 extending beyond the periphery of a collar 10 of the fork member at the swivel connection 2. In the offset 8 is provided a centrally located detent seat as recess 9 in the form of a hole bored through the same. In Fig. 3 it will be seen that the side edge portions of the offset 8 are inclined upwardly to form complementary secondary cam surfaces as butterfly guide shoulders 11. Centrally the offset 8 is reversely curved forming complementary primary cam surfaces as momentum shoulders 12 so that recess 9 is at the central point of the concave central portion of the offset 8. The recessed offset provides, in cooperation with a detent projection shown as mounted on collar 10, a swivel lock catch.

Welded to the outer edge surface of the collar 10 of the caster forks as in Fig. 1 a short vertical tube 13 houses a compression spring 14 and a ball detent 15. The open top of the tube (see Fig. 3) is restricted and retains ball 15 within the tube end yet permits its partial extension for seating in recess 9. The spring presses the ball outwardly to project from the opening, the spring being seated in the tube on an adjustable plug 16 closing the other end. Plug 16 is threaded into the tube end for adjusting the tension of spring 14. A nut 17 threaded on the plug 16 serves to lock the plug in the position to which the same may be turned.

The recess and detent are offset as far as possible from the swivel axis of the caster to take advantage of the thrust force exerted as the wheel and fork member swing from transverse to inline locking position.

When, by rotation of the fork on stem 1, the tube 13 moves towards registration with the offset 8, ball 15 rides on the inclined surface of cam shoulder 11, being gradually urged against spring 14 until reversely curved cam shoulder 12 is reached, at which point the pressure of the ball on the cam shoulder 12 provides sudden additional momentum to the rotative force of the fork about the stem and the ball rides quickly to the center of the offset where the tension of the spring snaps it into the recess. The spring will hold the ball seated as shown with the caster fork locked against rotation until such time as sufficient rotative force is applied to the swivel connection to cam the ball out of the recess and along the shoulder. Thus the caster is released for swivelling. The plug 16, of course, permits adjustment for a predetermined tension on the ball as may be desired.

In Fig. 3 the shoulders 11 and 12 have been formed by bending the metal of the offset in a press operation. It is to be noted that these surfaces could also be provided by machining operations on the under surface of an otherwise planar offset piece (see Fig. 8). Further, a central recess could be provided by a semi-cylindrical socket reversely pressed or machined in the metal.

From the above description it will be appreciated that the caster may be mounted with its stem fixed in any predetermined angular position with respect to the leg support which it carries.

By suitably selecting the so fixed position of the offset the ball detent will register with the offset recess in the position desired for locking the swivel. Preferably a stretcher, or other device will have its caster offsets 8 directed outwardly from the respective ends of the device. The wheels at the leading end of the device, as it is pushed, will then automatically be held by the detents in line with the direction of travel. The placement of parts is, of course, a matter of choice as may be dictated by convenience in normal use. When the locking mechanisms are positioned to hold the casters as just described, a device will be automatically placed in condition for easy transportation and guidance by one attendant.

In fact, one attendant may easily manage two devices equipped with casters of such construction by pushing the rear end of each with one hand. The trailing caster wheels will be enabled to swivel freely for any slight turning or for the easy direction of the bed around a turn. The leading wheels being held parallel with the longitudinal center line of the device will maintain it in a straight path of travel except when a positive pressure is exerted to twist the wheels out of lock and out of such alignment. When the wheels are so out of lock, they are free to swivel outside of the locked position in any direction.

Upon application of a sufficient force to twist the swivel connection the projecting semi-cylindrical cam surface of the ball which is being held for limited outward movement of its tube housing will roll out of the recess and past the reversely curved pair of opposing shoulders by depressing its spring 14 and the caster will turn free of the detent mechanism. When the device is again pushed in a straight path forwardly or rearwardly the leading wheels will again automatically be locked against swivel movement.

It should be noted in the view shown by Fig. 2 that a hole elongated radially of the swivel caster in the nature of an oval is provided for receiving the ball. This feature of construction is desirable and important in that provision is thereby made for proper operation of the automatic lock when the caster connection between wheel fork 3 and stem 1 becomes slightly loose after continued long service. The offset rotation of the wheel and its axle to the stem support in the usual caster construction is such that an angular force is constantly applied under load conditions on the swivel connection. A slight angular displacement of the wheel fork with respect to the stem, while it does not impair efficient caster operation, will cause a correspondingly angular relation of the tube 13 to offset 8. Accordingly, the hole 9 is elongated to insure reception of the ball 15 between its opposite edges through the normal life of a caster.

Fig. 4 shows a modified form of locking mechanism in which the reversely curved cam shoulders 12 have been eliminated from the offset element 8. Inclined cam surfaces 11' extend centrally on the offset 8 to the opposite retaining edges of central recess 9 and provide continuously decreasing resistance to the approach of the ball 15 to the hole 9. As shown the ball 15 is urged into the hole 9 by a spring 14 which may be adjustably tensioned as in the form of Figs. 1–3.

Fig. 5 shows an adaptation, in slightly modified form, of the locking mechanism to a different caster construction used where a smaller, lighter, and less expensive caster is desired. A difference will be noted in that the tube closure element is not adjustable as it was in Figs. 1–3. Further, the tube housing in Fig. 5 is fixed at its base on an offset table 20 integral with the wheel fork members of the caster, rather than welded to the collar 10 as in Figs. 1–3.

Figs. 6, 7 and 8 show an adaptation of the invention to a form of construction known as a plate caster. This form of caster is adapted for heavy industrial uses and is accordingly heavier and sturdier than the forms hereinbefore described. The cart, truck, or other device to be supported is fixed to the caster on a supporting member as horizontal plate 21 by means of bolts or rivets set in plate holes 22. Swivel connection 23 provides free-swivelling communication between plate 21 and fork plate 24 to which wheel fork members 25 are firmly secured as by rivets 26. The tube housing 13 for the spring and ball detent is welded in a vertical position to one edge of fork plate 24; guide and momentum shoulders 27 and 28 respectively, and lock recess 29, are machined on the under surface of a metal block 30 which is welded on the under surface of upper plate 21 adjacent the outer edge thereof to intercept the detent as it swings with the swivelling fork plate 24.

In Fig. 9 a different caster construction is shown in which the forked wheel support 31 provides a horizontally disposed hooded portion 32. The caster stem is provided with two spaced expanding applicators 33 of rubber, the upper applicator not being here shown. This form of caster is a well-known commercial type. It is adapted for attachment in a tubular leg support by compressing the applicators which are separated as by a spacer sleeve 34. The stem assembly is locked in the leg by frictional engagement of the applicators against the inner wall of the tube.

The horizontal portion 32 of the wheel support is provided with a recess 35 and if desired momentum shoulders downwardly inclined towards the edges thereof may be provided in the upper surface of this portion. In this particular modification of the new construction a tube, spring and ball assembly 36 is fixed in a bracket 37 to interlock the ball with the recess 35 when the movable caster wheel fork member is rotated to intercept said recess. The bracket 37 may be held stationarily on the stem in any suitable manner. As shown by Fig. 10 the bracket is formed by an elongation 38 of a hexagonal nut which fits over a hexagonal shoulder 39 on the caster stem itself.

Another modification of the construction is shown by Fig. 11 in which there is substituted for the spring pressed ball and tube assembly on collar 10, a bracket 40 of spring metal fixed thereto as by screws 41. A right angled spring arm 42 of the bracket is provided with a dome 43 for seating in recess 9. The dome 43 which may be fixed on the spring arm as by welding or as shown here deformed from the metal of the arm itself, is constantly urged under spring pressure and by the inclined surfaces of cam shoulders adjacent the recess, to intercept the recessed offset in the same manner as the ball element 15 previously described.

It will be noted further in this construction that the disk 44 is attached as by welding to the tubular leg support in which the stem 1 of the caster is fixed.

It is obvious that in all the forms herein disclosed, the forked member and the supporting member are freely swivellable through 360° except for a small arc which includes the position of inter-locking of the detent and the recessed detent seat. As the detent approaches the recess, a certain resistance to the progress of the detent is interposed by means of cam shoulders or cam surfaces associated with the recess whereby it is assured that the caster will not be locked unintentionally or accidentally. It is desirable that this resistance be relatively small, for easy locking. In all forms except that of Fig. 4, easy locking is greatly facilitated by means of cam shoulders to assist the detent in seeking the center of the offset. Once the caster is locked against swivelling, however, it is desirable that it remain locked against the normal pressures and shocks of use of the bed or other conveyance to which it may be attached, to be released for swivelling only by an intentional application of force by the attendant. For this reason, the relative spacing of the retaining edges of the detent seat is such that the detent is securely contained between said edges. Further, the lock assisting cam shoulders mentioned above provide central retaining resistance against easy unseating of the detent. A substantially greater torsional pressure thus is required to unlock the caster than is required to lock it.

What is claimed is:

1. In an automatically locking caster having a forked member, a wheel rotatably carried thereby and a supporting member, said members being inter-connected for relative swivel movement about an axis at right angles to and offset from the axis of rotation of said wheel, two inter-engaging elements, one fixed to each of said members and radially spaced from said axis of swivel movement, said elements yieldingly inter-engaging in one position of relative swivelling of said members, said elements being engageable and disengageable by application of a torque to one of said members, one of said elements being provided with a recess having the edges thereof elongated radially of said axis of swivel movement for engaging the other of said elements, means positioned adjacent each side of said recess to vary the resistance to relative swivelling of said members when said elements are adjacent said interengaging position, said last named means comprising complementary primary cam surfaces extending outwardly from the radial edges of said recess in the path of and inclined toward said other element and complementary secondary cam surfaces extending outwardly from said primary cam surfaces in the path of and inclined away from said other element, the angle of inclination of said primary surfaces being less than the angle of inclination of said secondary surfaces taken from a line joining the intersection of said angles.

2. In an automatically locking caster having a forked member, a wheel rotatably carried thereby and a supporting member, said members being inter-connected for relative swivel movement about an axis at right angles to and offset from the axis of rotation of said wheel, two interengaging elements, one fixed to each of said members and radially spaced from said axis of swivel movement, said elements yieldingly interengaging in one position of relative swivelling of said members, said elements being engageable and disengageable by application of a torque to one of said members, one of said elements including a recessed portion having the edges thereof spaced radially from said axis of swivel movement for engaging between said edges the other of said elements, means positioned adjacent each side of said recess to vary the resistance between said elements adjacent the position of interengaging relation, said last-named means comprising complementary primary cam surfaces extending outwardly from the radial edges of said recess in the path of and inclined toward said other element and complementary secondary cam surfaces extending outwardly from said primary cam surfaces in the path of and inclined away from said other element.

3. In an automatically locking caster having a forked member, a wheel rotatably carried thereby and a supporting member, said members being inter-connected for relative swivel movement about an axis at right angles to and offset from the axis of rotation of said wheel, said supporting member including a circular disk, the axis of which is coincident with said axis of swivel movement, having an offset extending radially from said axis of swivel movement, said offset being provided with a slotted portion having the edges of the same spaced from said axis and elongated radially thereof, a spring pressed detent fixed to said forked member and spaced from said axis of swivel movement at a radial distance equal to the spacing of said slotted portion, said detent in one position of relative swivelling of said members being yieldably engageable between said edges, the surface portions of said offset at each side of said slot extending outwardly from the edges thereof in the path of and inclined toward said forked member, said offset also having additional inclined surface portions adjacent said inclined surfaces, said additional surface portions being in the path of and inclined away from said forked member and terminating at the edges of said offset, said forked member in a position of non-engagement between said offset and detent being free for unrestricted swivel movement relative to said support.

JOHN F. KOSTOLECKI.

REFERENCES CITED

The following references are of record in the file of this patent:

UNITED STATES PATENTS

| Number | Name | Date |
|---|---|---|
| 1,179,614 | Crompton | Apr. 18, 1916 |
| 1,752,183 | Kell | Mar. 25, 1930 |
| 1,827,595 | MacGuire | Oct. 13, 1931 |
| 2,051,627 | Weinmann | Aug. 18, 1936 |
| 2,108,326 | Adams | Feb. 15, 1938 |
| 2,306,179 | Mulholland | Dec. 22, 1942 |
| 2,367,993 | Bishop | Jan. 23, 1945 |
| 2,422,892 | Forbes et al. | June 24, 1947 |
| 2,482,961 | Bishop | Sept. 27, 1949 |
| 2,505,852 | Budnick et al. | May 2, 1950 |